United States Patent
Piovano

(10) Patent No.: US 12,459,193 B2
(45) Date of Patent: *Nov. 4, 2025

(54) METHOD AND KIT FOR NON-DESTRUCTIVE IN SITU REPAIR (RELINING) OF DETERIORATED PIPELINES

(71) Applicant: Applied Resin S.L., Madrid (ES)

(72) Inventor: Roberto Piovano, Castellamonte (IT)

( * ) Notice: Subject to any disclaimer, the term of this patent is extended or adjusted under 35 U.S.C. 154(b) by 28 days.

This patent is subject to a terminal disclaimer.

(21) Appl. No.: 18/247,558

(22) PCT Filed: Oct. 5, 2021

(86) PCT No.: PCT/IB2021/059101
§ 371 (c)(1),
(2) Date: Mar. 31, 2023

(87) PCT Pub. No.: WO2022/074545
PCT Pub. Date: Apr. 14, 2022

(65) Prior Publication Data
US 2023/0373154 A1    Nov. 23, 2023

(30) Foreign Application Priority Data
Oct. 5, 2020    (IT) .................. 102020000023440

(51) Int. Cl.
*B29C 63/00*    (2006.01)
*B29C 63/34*    (2006.01)
*F16L 55/165*   (2006.01)

(52) U.S. Cl.
CPC ........ *B29C 63/0017* (2013.01); *B29C 63/341* (2013.01); *F16L 55/1654* (2013.01); *F16L 55/1656* (2013.01)

(58) Field of Classification Search
CPC ... B29C 63/0017; B29C 63/341; B29C 63/36; B29C 63/26; B29C 63/34; F16L 55/1653; F16L 55/1654; F16L 55/1656
See application file for complete search history.

(56) References Cited

U.S. PATENT DOCUMENTS

| | | | |
|---|---|---|---|
| 2015/0369399 A1* | 12/2015 | Fyfe | F16L 58/1009 138/97 |
| 2016/0169437 A1* | 6/2016 | Schwert | F16L 55/1656 138/97 |

FOREIGN PATENT DOCUMENTS

| | | |
|---|---|---|
| EP | 1762581 | 3/2007 |
| KR | 20110128029 | 11/2011 |
| WO | 2016133393 | 8/2016 |

* cited by examiner

*Primary Examiner* — Philip C Tucker
*Assistant Examiner* — Jimmy R Smith, Jr.
(74) *Attorney, Agent, or Firm* — Themis Law

(57) ABSTRACT

A method for relining a pipeline includes providing and using a composition that includes (a) a resin crosslinkable by action of a photoinitiator that is activated with actinic light, (b) a resin crosslinkable by action of a co-hardening compound; (c) a photo-initiator compound that can be photoactivated by irradiation with actinic light; and (d) a co-hardener compound added before use that is a semilatent co-hardener or a co-hardener at room temperature. A kit for relining a pipeline according to this method includes (1) a container containing (a), (b) and (c); (2) a container containing (d); (3) a substrate for impregnation with the composition resulting from mixing the contents of container (1) and container (2); and, optionally, (4) a source of actinic light and a generator of a flow of gas or liquid at adjustable pressure.

11 Claims, No Drawings

METHOD AND KIT FOR NON-DESTRUCTIVE IN SITU REPAIR (RELINING) OF DETERIORATED PIPELINES

TECHNICAL FIELD

The present invention relates to a method for relining a pipeline which uses a composition comprising at least one resin that can be cross-linked by the action of an actinic light-activatable photoinitiator and at least one resin that can be cross-linked by the action of at least one co-hardening compound. The present invention also relates to a kit comprising said composition.

BACKGROUND

In recent years, the "relining" and so-called "CIPP" (Cured in place Pipe) sector, that is the non-destructive in situ remediation/repair of damaged pipes, downspouts, pipelines or water pipes, has aroused more and more interest as it allows to carry out remediation/repair work on worn and/or damaged water networks without having to completely replace the concerned line. This possibility is therefore particularly attractive in the case of minor damage where the damage to the water network is not caused by serious structural failures but rather by the much more common infiltrations or micro-fractures, thus allowing remarkable savings from a socio-economic point of view, reducing in fact the cost of the operator's intervention in terms of materials, time and safety but also the inconvenience necessarily caused to citizens by the demolition and reconstruction of roads and buildings.

In the current state of the art, systems are known which provide for the insertion of a sheath, called "sock", generally composed of a thermoplastic and flexible polymeric support (for instance polyolefin or polyester polyurethane) inside the pipeline of interest reinforced with fabric, non-woven fabric or polyester felt or glass blend, impregnated with various types of hardening compositions. Once inserted, the sheath is made to mechanically adhere to the internal surfaces of the pipeline by means of the action of air pressure or other gas blown by a special machine or a liquid until, due to the cross-linking (and therefore hardening) of the resin, the impregnated sheath acquires sufficient stiffness to remain positioned and consolidated on site and to make it possible to restart the pipeline itself.

However, these systems have countless disadvantages related to the complexity of the equipment to be brought on site, the energy cost necessary for the activation of the hardening compositions and/or the long duration of the operation. In fact, in the case of resins that are activated with hot water, it is necessary to heat large volumes of water and keep them at temperature for a few hours while in the case of resins that are activated at room temperature, it is necessary to wait several hours before the impregnated sheath achieve sufficient stiffness.

To overcome these problems, some types of hardening compositions have been developed that are photoactivable (i.e. photo-crosslinkable) by actinic light irradiation, so as to allow a stiffening of the impregnated sheath in a short time and without having to heat and maintain large volumes of water at temperature. Even in this case, however, there are countless disadvantages, particularly related to the fact that, in some particular situations it is difficult to irradiate the entire impregnated sock in a uniform manner inside the pipe, particularly in the case of particularly long, dirty or that have sharp bends or other unevennesses. In this case, in fact, there are so-called "shadow areas" not reached by UV light (and in fact not crosslinkable efficiently or crosslinkable with insufficient crosslinking depth), which doubtless affect the overall performance of the repair. The need therefore remains in the sector to provide a composition that allows to obtain the desired hardening depths, in a short time, and that allows the achievement of effective performance even in the case of pipelines that have shadow areas or angular or irregular morphologies.

The present invention solves the drawbacks of the prior art by providing a method and relative kit for relining deteriorated pipelines comprising the use of a composition comprising at least one resin crosslinkable by the action of a photoinitiator which can be activated with actinic light and at least one resin crosslinkable by the action of a co-hardening compound which, thanks to the different ways of action of said compounds, allows to obtain the in situ remediation and/or non-destructive repair of pipes with adequate hardening depth and performance also for pipes that have shadow areas. The operating times for the remediation and/or repair of pipelines using the composition of the invention are remarkably short.

SUMMARY OF THE INVENTION

The present invention relates to a method for the in situ non-destructive remediation and/or repair of a pipeline comprising the steps of:
i) making available a composition, comprising:
   a) at least one resin selected in the group consisting of an acrylic, methacrylate, unsaturated polyester, acrylate polyester, epoxy acrylate, polyurea acrylate, bisphenol acrylic, vinyl, vinyl ester, vinyl ether, polyether acrylate resin and a combination thereof;
   b) at least one resin selected in the group consisting of an epoxy, oxirane, oxethane, polyurethane, cycloaliphatic epoxy resin and a combination thereof;
   c) at least one photoinitiator compound, which can be photoactivated by irradiation with an actinic light source having a wavelength between 100 and 600 nm;
ii) adding to the composition of step i):
   d) at least one co-hardener compound selected in the group consisting of a semilatent co-hardener, a co-hardener at room temperature and a combination thereof, said cross-linking action not depending on the presence and/or persistence of irradiation with a source of actinic light having a wavelength between 100 and 600 nm;
iii) impregnating a substrate with the composition of step ii);
iv) inserting the impregnated substrate inside the pipeline to be remediated and/or repaired;
v) expanding or everting, preferably by means of the inversion technique, said substrate against the internal surfaces of the pipeline by applying a flow of air or other gas or a liquid;
vi) activating the at least one photoinitiator included in the composition by irradiation with an actinic light source having a wavelength between 100 and 600 nm;
vii) removing the application of the flow of air or other gas or liquid, preferably after a waiting time of between 1 to 60 minutes.

The present invention also relates to a kit for the in situ non-destructive remediation and/or repair of a pipeline according to said method, comprising:

1) a container comprising the composition of step i);
2) a container comprising at least one co-hardening compound d) as described in step ii);
3) a substrate suitable to be impregnated with a composition as described in step iii) and suitable to be inserted inside a pipeline to be remediated and/or repaired; said composition resulting from mixing the contents of the container 1) with the contents of the container 2); and eventually
4) an actinic light source having a wavelength between 100 and 600 nm and a generator of a flow of air or other gas or a flow of liquid at adjustable pressure.

DETAILED DESCRIPTION

For the purposes of the present invention, the term "actinic light" or "actinic radiation" means an electromagnetic radiation having a wavelength between 100 and 600 nm.

"Broad spectrum UV lamp" means, for the purposes of the present invention, a lamp that emits electromagnetic radiation having a wavelength greater than 200 nm, preferably between 200 and 650 nm.

For the purposes of the present invention, the term "UV LED" means a light emitting diode in the wavelengths between 300 and 600 nm.

For the purposes of the present invention "(photo) activatable with/by actinic light" means a composition which, due to irradiation with an actinic light source, crosslinks thus becoming a "photo-crosslinked polymer composition". For the purposes of the present invention, therefore, the aforesaid "(photo) activatable with/by actinic light" compositions are also referred to as "photo-crosslinking" compositions. Similarly, for the purposes of the present invention, the expressions "crosslinkable resin by the action of a photoinitiator which can be activated with actinic light" and the expression "photo crosslinkable resin" are used as synonyms.

For the purposes of the present invention "photoactivable photoinitiator compound" means a chemical compound which, due to irradiation with an actinic light source, allows the activation and propagation of polymerization reactions by generating reactive species or generators of crosslinkers (Lewis acids, superbases etc.).

For the purposes of the present invention, the composition of step ii) is also called "bi-component composition", that is a composition comprising compounds a), b) and c) as "first component" and the co-hardening compound d) as "second component".

"Co-hardening compound" means a hardening agent which, in the case of the present invention, represents the second component of the bi-component composition obtained in step ii) and which cooperatively contributes to the cross-linking of the composition, particularly to the cross-linking of the non photo-crosslinkable part of the composition and/or to the crosslinking of different functional groups of the same photo-crosslinked polymer.

"Semi-latent hardener" means a hardening agent which, in the case of the present invention, represents the second component of the bi-component composition obtained in step ii) and which is activated at room temperature due to mixing with the first component of the bi-component composition and which has a relatively long pot-life, ranging from over 12 hours to 60 and more days (at room temperature of about 20° C.)

"Hardener at room temperature" means a hardening agent which, in the case of the present invention, represents the second component of the bi-component composition obtained in step ii) and which is activated at room temperature due to mixing with the first component and which has a relatively short pot-life time, ranging from a few minutes to 12 hours (at room temperature of about 20° C.)

For the purposes of the present invention, the term "resin" is intended to comprise both polymers and monomers and oligomers.

It is an object of the present invention a method for the in situ non-destructive remediation and/or repair of a pipeline comprising the steps of:
i. making available a composition comprising:
 a. at least one resin selected in the group consisting of an acrylic, methacrylate, unsaturated polyester, acrylate polyester, epoxy acrylate, polyurea acrylate, bisphenol acrylic, vinyl, vinyl ester, vinyl ether, polyether acrylate resin and a combination thereof;
 b. at least one resin selected in the group consisting of an epoxy, oxirane, oxethane, polyurethane, cycloaliphatic epoxy resin, and a combination thereof;
 c. at least one photo-initiator compound that can be photoactivated by irradiation with an actinic light source having a wavelength between 100 and 600 nm;
ii. adding to the composition of step i):
 d. at least one co-hardener compound selected in the group consisting of a semilatent co-hardener, a co-hardener at room temperature and a combination thereof, whose cross-linking action does not depend on the presence and/or persistence of irradiation with a source of actinic light having a wavelength between 100 and 600 nm;
iii. impregnating a substrate with the composition of step ii);
iv. inserting the impregnated substrate inside the pipeline to be remediated and/or repaired;
v. expanding or everting, preferably by means of the inversion technique, said substrate against the internal surfaces of the pipeline by applying a flow of air or other gas or a flow of liquid, by applying said flow up to a certain constant pressure;
vi. activating the at least one photoinitiator comprised in the composition by irradiation with an actinic light source having a wavelength between 100 and 600 nm;
vii. removing the application of the flow of air or other gas or a flow of liquid, preferably after a waiting time of between 1 and 60 minutes, more preferably between 10 and 40 minutes.

According to an embodiment of the invention, step iii) is carried out immediately after or in a relatively short period of time after step ii), preferably said period of time being less than 5 minutes, more preferably less than 1 minute, even more preferably less than 30 seconds.

According to an embodiment, the composition of the invention can optionally comprise at least one additive added to the composition obtained in step i) and/or to the composition obtained in step ii); said additive being preferably selected in the group consisting of: an accelerator, a diluent, a pigment, a dye, a flame retardant agent, a thixotropic agent, a thixotropic adhesion promoter, a plasticizer, an extender, a filler, a reinforcing agent, preferably selected from a mineral silicate, mica, quartz powder, hydrated alumina, glass, bentonite, wollastonite, kaolin, silica airgel; a flow control agent, preferably selected from a silicone, a wax and a stearate.

According to a preferred embodiment of the invention, the at least one photoinitiator compound c) is present in an amount comprised between 0.00001 and 20% by weight, preferably between 0.01 and 5% by weight, more preferably between 0.01 and 3% by weight with respect to the total weight of the composition.

According to an embodiment of the invention, the at least one photoinitiator compound c) is a radical photoinitiator. Preferably said radical photoinitiator is a type I, II or III radical photoinitiator selected in the group consisting of: α-aminoketone, acylophosphine oxide, preferably 2,4,6-trimethylbenzolyl diphenyl phosphine oxide and bis-(2,6-dimethoxybenzoyl)-2,4,4-trimethylphenylphosphine, phenyl glyoxylate, methyl phenyl glyoxylate, benzophenone, thioxanthone, isopropylthioxanthone (ITX), camphorquinone, 1-chloro-4-propoxythioxanthone (CPTX), titanocene, α-hydroxyketone, Michler's ketone, α,α-dimethoxy-2-phenylacetophenone (DMPA), α,α-diethoxy acetophenone, α-hydroxy-α,α-alkyl acetophenone, preferably α-hydroxy-α,α-dimethyl acetophenone, 1-benzoylcyclohexanol, 3-ketocoumarin, and a combination thereof.

According to another embodiment, the at least one photoinitiator compound c) is a cationic photoinitiator. Preferably said cationic photoinitiator is selected in the group consisting of: a triarylsulfonium salt, a diaryl iodonium salt, an iodonium salt or a sulfonium salt of $SbF_6^-$, $PF_6^-$ or $SO_3CF_3^-$, preferably 4-thiophenyl phenyl diphenyl sulfonium hexafluoroantimonate and triphenylsulfonium hexafluorophosphate; and a combination thereof.

According to another embodiment, the at least one photoinitiator compound c) is an anionic photoinitiator.

According to an embodiment of the invention, the at least one resin of point a) is selected in the group consisting of: diethylene glycol dimethacrylate, triethylene glycol dimethacrylate, tetraethylene glycol dimethacrylate, dipropylene glycol dimethacrylate, di-(pentamethylene glycol) dimethacrylate, tetraethylene diglycerol diacrylate, diglycerol tetramethacrylate, tetramethylene dimethacrylate, ethylene dimethacrylate, neopentyl glycol diacrylate, trimethylol propane triacrylate, (meth) acrylic esters of bisphenol A ethoxylate, polyarylamides of polystyrene, polyvinyl acetate, polyvinylpyrrolidone, acrylonitrile-butadiene-styrene (ABS), acrylate epoxy monomers (i.e. the reaction propipelines of epoxy compounds or prepolymers with acrylic or methacrylic acids), urethane acrylate prepolymers, polyester acrylate oligomers and a combination thereof.

Preferably said at least one resin of point a) is selected in the group consisting of: triethylene glycol dimethacrylate, polyethylene glycol dimethacrylate and a combination thereof.

According to an embodiment of the invention, the at least one resin of point b) is selected in the group consisting of: aliphatic, cycloaliphatic, aromatic and/or heterocyclic substituted or unsubstituted polyepoxides such as for instance glycidyl esters, glycidyl ethers, glycidylamines, epoxidized olefins and a combination thereof.

Preferably, in the embodiment in which said polyepoxides are substituted, they are substituted with substituents selected from: halogen and hydroxyl.

According to an embodiment of the invention, the preferred polyepoxides are glycidyl polyethers having equivalent epoxide weights ranging from 175-4000, preferably 175-1200, more preferably 175-700. Said glycidyl polyethers are preferably aromatic and are formed by reacting an epihalohydrin, preferably epichlorohydrin with mononuclear or polynuclear phenols such as for instance 4,4'-isopropylidenediphenol (bisphenol A), 4,4'-isopropylidenebis (2,6-dibromophenol), 1,1,3-tris (p-hydroxyphenyl) propane, 1,1-bis (4-hydroxyphenyl) ethane, 1,1,2,2-tetra (p-hydroxyphenyl) ethane, bis-(4-hydroxyphenyl) methane, 4,4'-dihydroxydiphenyl sulfone, 2,2-bis-(4-hydroxyphenyl)-propane, 2,2-bis-(3,5-dibromo-4-hydroxyphenyl)-propane, hydroquinone, resorcinol, dihydroxyphenyl, dihydroxy naphthalene, phenol-formaldehyde novolac, p-aminophenol and o-cresol-formaldehyde novolac.

According to an embodiment, said at least one resin of point b) is selected from: polyglycidyl ethers or poly-(β-methylglycidyl) ethers derived from acyclic or cycloaliphatic alcohols, said acyclic alcohols preferably being selected from ethylene glycol, diethylene glycol, higher poly-(oxyethylene) glycols, propane-1,2-diol, poly-(oxypropylene) glycols, propane-1,3-diol, butane-1,4-diol, poly-(oxytetramethylene) glycols, pentane-1,5-diol, hexane-1,6-diol, hexane-2,4,6-triol, glycerol, 1,1,1-trimethylolpropane, pentaerythritol, sorbitol and polyepichlorohydrines; said cycloaliphatic alcohols preferably being selected from 1,4-cyclohexanedimethanol, bis-(4-hydroxycyclohexyl)-methane, 2,2-bis-(4-hydroxycyclohexyl)-propane, N,N-bis-(2-hydroxyethyl)-aniline and p p'-bis-(2-hydroxyethylamino)-diphenylmethane.

According to an embodiment of the invention, the at least one resin of point b) is a cycloaliphatic epoxy resin selected in the group consisting of: bis-(2,3-epoxycyclopentyl) ether, 2,3-epoxycyclopentyl glycidyl ether, 1,2-bis-(2,3-epoxycyclopentyloxy)-ethane, 3,4-epoxycyclohexylmethyl 3',4'-epoxycyclohexanecarboxylate and a combination thereof. Preferably said at least one resin of point b) is selected in the group consisting of: bisphenol A diglycidyl ether (DGEBA), bisphenol F diglycidyl ether (DGBF), epoxy cresol novolac, bis-(2,3-epoxycyclopentyl) ether, 2,3-epoxycyclopentyl glycidyl ether, 1,2-bis-(2,3-epoxycyclopentyloxy)-ethane, 3,4-epoxycyclohexylmethyl 3',4'-epoxycyclohexanecarboxylate.

According to an embodiment, said at least one co-hardener compound d) is a semilatent co-hardener. Preferably, said semilatent co-hardener is selected in the group consisting of: complexes of metal salts of imidazoles, hydrazides of carboxylic acids, derivatives of triazine, derivatives of melamine, organic acid anhydrides, polycarboxylic acids, anhydrides of carboxylic acids, solid amines, guanidines, aromatic polyamines and a combination thereof.

More preferably, said semilatent co-hardener is selected in the group consisting of: 1-(2-cyanoethyl)-2-ethyl-4-methylimidazole, nadic anhydride, adipic acid dihydrazide, isophthalic acid dihydrazide, anthranilic acid hydrazide, 2-phenyl-4,6-diamino-s-triazine (benzoguanamine), 2-lauryl-4,6-diamino-s-triazine (lauroguanamine), phthalic acid, isophthalic acid, terephthalic acid, hexamethylenetetramine, 1,3 diamino benzene, 4,4'-methylenedianiline and a combination thereof.

According to an embodiment of the invention, said at least one co-hardener compound d) is a co-hardener at room temperature. Preferably, said co-hardener at room temperature is selected in the group consisting of: azonitriles, alkyl peroxides, acyl peroxides, hydroperoxides, ketone peroxides, peresters, peroxide carbonates, azo compounds, and a combination thereof.

Preferably, said co-hardener at room temperature is selected in the group consisting of: azobisisobutyronitrile, phenyl-azo-triphenylmethane, t-butyl peroxide, benzoyl peroxide, cumene hydroperoxide, t-butyl peracetate, benzenesulfonyl azide, and a combination thereof.

According to a preferred embodiment of the invention, when the at least one photoinitiator compound c) is a cationic photoinitiator, the at least one co-hardening compound d) is a co-hardening compound at room temperature.

Preferably, said at least one co-hardening compound d) is activated independently or is activated indirectly by irradiation with an actinic light source of step v). Preferably, said at least one co-hardening compound d) is activated subsequently or simultaneously with the at least one photoinitiator, even more preferably subsequently.

Without being linked to a specific theory, the Applicant has found that the use of said at least one resin a) (which is a resin that can be photo-crosslinked by actinic light, particularly by the action of said at least one photoinitiator c)) and of said at least one resin b) (which is a crosslinkable resin by the action of at least one co-hardening compound d)) allows to harden the composition in two steps and with different times.

The Applicant has in fact found that thanks to the presence of the at least one resin a) and of the at least one photoinitiator compound that can be photoactivated by actinic light c) comprised within the composition, due to irradiation with an actinic light source, it is possible to obtain a first partial and relatively fast cross-linking of the composition and, consequently, a first and partial hardening of the sheath impregnated with said composition, preferably in a time comprised between 1 and 60 minutes, more preferably between 10 and 40 minutes.

Such a first hardening (which mainly affects the photo-crosslinkable part of the composition), although partial, is nevertheless sufficient to ensure a certain preliminary stiffness of the sheath impregnated with the composition of the invention, thus allowing the pipeline to be put back into service after a relatively short waiting time, preferably between 1 and 60 minutes, more preferably between 10 and 40 minutes (step vii).

This preliminary stiffness allows the sheath impregnated with the composition of the invention to self-sustain and not to move even once the pipeline is put back into service and/or during the dissipation of the exothermic heat developed by the crosslinking reactions, thus advantageously allowing to shorten the operational times for the remediation and/or repair of the pipeline itself.

Subsequently, thanks to the presence of the at least one resin b), crosslinkable by the action of the at least one co-hardening compound d), or with a crosslinking mechanism that does not depend on the presence and/or persistence of irradiation with an actinic light source, the crosslinking of the composition is completed in a subsequent period of time ranging from a few hours to a few months depending on the nature of the at least one co-hardening compound d) added in step ii).

Without being linked to a specific theory, the Applicant has nevertheless found that this subsequent completion of the crosslinking (which mainly affects the non-crosslinkable part of the composition) also occurs once the pipeline is put back into service, i.e. during the use of the pipeline itself (even in the presence of water inside it), and allows not only to obtain a greater depth of crosslinking but also a desirable degree of crosslinking and, therefore, stiffness, even in the areas of the impregnated sheath not sufficiently irradiated by actinic light.

According to an embodiment, said actinic light source of step v) is selected from: a broad spectrum UV lamp, a visible light lamp, a UV LED, a visible LED and a combination thereof.

According to an embodiment of the invention, said substrate is a sheath made of a material selected from: glass fiber, non-woven fabric, unidirectional or multidirectional non-woven fabric, polymeric felt, and a combination thereof.

Another object of the present invention is a kit for the in situ non-destructive remediation and/or repair of a pipeline according to the method of the invention as previously described.

This kit comprises:

1) a container comprising the composition described in step i) of the method according to the present invention;
2) a container comprising the at least one co-hardener compound d) selected in the group consisting of a semilatent co-hardener, a co-hardener at room temperature and a combination thereof as described in step ii) of the method according to the present invention;
3) a substrate suitable to be impregnated with said composition as described in step iii) of the method according to the present invention and suitable to be inserted inside a pipeline to be remediated and/or repaired; said composition resulting from mixing the contents of the container 1) with the contents of the container 2); and eventually
4) an actinic light source having a wavelength between 100 and 600 nm and a generator of a flow of air or other gas or a flow of liquid at adjustable pressure, preferably adjustable to a constant pressure value.

According to a particularly preferred embodiment of the invention, said substrate is a sheath made of a material selected from: glass fiber, non-woven fabric, unidirectional or multidirectional non-woven fabric, polymeric felt, and a combination thereof.

EXAMPLES

A polyester felt sheath (size den=100) impregnated with the composition formulated according to the present invention was everted inside a polypropylene pipe taken as a model of a standard pipeline.

The photoinitiator comprised in the composition was activated by irradiation with a broad spectrum UV lamp in order to start the crosslinking of the photoactivable part of the composition (by at least one photo-crosslinkable resin).

The sheath impregnated with the (hardened) composition was extracted and separated from the polypropylene pipe in order to submit it to the technical resistance tests after 1 day (24 hours) (i.e. tests with a low percentage of hardened non-photo-crosslinkable resin), shown in Table 1.

TABLE 1

| Test | N | Bending (mm) | Stress in bending (Mpa) | Deformation in bending (%) | Bending modulus (Mpa) |
|---|---|---|---|---|---|
| P1 | 126.6 | 9.42 | 45 | 3.46 | 2982 |
| P2 | 132.8 | 10.62 | 47 | 3.87 | 2977 |
| P3 | 129.7 | 10.08 | 45 | 3.72 | 2899 |
| average | 129.7 | 10.04 | 46 | 3.68 | 2953 |

The results obtained were compared with the same mechanical strength tests performed after 7 days (i.e. tests with a high percentage of hardened non-crosslinkable resin), shown in Table 2.

The tests indicate a high additional strength achieved by the composition and an increase in the bending modulus indicating the successful crosslinking of the non-photoactivable part which increases the final strength of the sample.

TABLE 2

| Test | N | Bending (mm) | Stress in bending (Mpa) | Deformation in bending (%) | Bending modulus (Mpa) |
|---|---|---|---|---|---|
| P1 | 184.5 | 11.22 | 76 | 4.78 | 3394 |
| P2 | 191.4 | 10.64 | 77 | 4.56 | 3347 |
| P3 | 172.4 | 10.91 | 71 | 4.62 | 3460 |
| average | 182.8 | 10.92 | 75 | 4.65 | 3400 |

The invention claimed is:

1. A method for in situ non-destructive remediation and/or repair of a pipeline comprising the steps of:
   i. making available a first composition comprising:
      (a) at least one resin selected from the group consisting of an acrylic, methacrylic, unsaturated polyester, acrylate polyester, epoxy acrylate, polyurea acrylate, bisphenol acrylic, vinyl, vinyl ester, vinyl ether, polyether acrylate resin, and a combination thereof;
      (b) at least one resin selected from the group consisting of an epoxy, oxirane, oxethane, polyurethane, cycloaliphatic epoxy resin, and a combination thereof;
      (c) at least one photo-initiator compound that can be photoactivated by irradiation with an actinic light source having a wavelength between 100 and 600 nm;
   ii. adding to the first composition:
      (d) at least one co-hardener compound selected from the group consisting of a semilatent hardener, a hardener at room temperature, and a combination thereof, an action of said co-hardener compound not depending on a presence and/or persistence of irradiation with the actinic light source having a wavelength between 100 and 600 nm,
      thereby creating a second composition;
   iii. impregnating a substrate with the second composition;
   iv. inserting the impregnated substrate inside the pipeline to be remediated and/or repaired;
   v. expanding or everting said substrate against internal surfaces of the pipeline by applying a flow of a gas or a liquid up to a pressure that is predetermined and constant;
   vi. activating the at least one photo-initiator compound comprised in the second composition by the irradiation with the actinic light source having a wavelength between 100 and 600 nm; and
   removing application of the flow of gas or liquid under the pressure.

2. The method according to claim 1, wherein the at least one photo-initiator compound is present in an amount comprised between 0.00001 and 20% by weight with respect to a total weight of the first composition.

3. The method according to claim 1, wherein said at least one photo-initiator compound is selected from the group consisting of: a radical photo-initiator, cationic photo-initiator, anionic photo-initiator, and a combination thereof.

4. The method according to claim 3, wherein said at least one radical photo-initiator is a type I, II or III radical photoinitiator selected from the group consisting of: α-aminoketone, acylophosphine oxide, 2,4,6-trimethylbenzolyl diphenyl phosphine oxide, bis-(2,6-dimethoxybenzoyl)-2,4,4-trimethylphenylphosphine, phenyl glyoxylate, methyl phenyl glyoxylate, benzophenone, thioxanthone, isopropylthioxanthone (ITX), camphorquinone, 1-chloro-4-propoxy-thioxantone (CPTX), titanocene, α-hydroxyketone, Michler's ketone, α,α-dimethoxi-2-phenylacetophenone (DMPA), α,α-diethoxy acetophenone, α-hydroxy-α,α-alkyl acetophenone, 1-benzoylcyclohexanol, 3-ketocoumarin, and a combination thereof, and wherein said cationic photo-initiator is selected from the group consisting of: a triarylsulfonium salt, a diaryl iodonium salt, an iodonium salt or a sulfonium salt of SbF6-, PF6- or SO3CF3-, 4-thiophenyl phenyl diphenyl sulfonium hexafluoroantimoniate, triphenyl sulfonium hexafluorophosphate, and a combination thereof.

5. The method according to claim 1, wherein said at least one resin (a) is selected from the group consisting of: diethylene glycol dimethacrylate, triethylene glycol dimethacrylate, tetraethylene glycol dimethacrylate, dipropylene glycol dimethacrylate, di-(pentamethylene glycol) dimethacrylate, tetraethylene diglycerol diacrylate, diglycerol tetramethacrylate, tetramethylene dimethacrylate, ethylene dimethacrylate, neopentyl glycol diacrylate, trimethylol propane triacrylate, (meth) acrylic esters of bisphenol A ethoxylate, polyarylamides of polystyrene, polyvinyl acetate, polyvinylpyrrolidone, acrylonitrile-butadiene-styrene (ABS), epoxy acrylate monomers being reaction products of epoxy compounds or prepolymers with acrylic or methacrylic acids, urethane acrylate prepolymers, polyether acrylate oligomers, polyester acrylate oligomers, and a combination thereof.

6. The method according to claim 1, wherein said at least one resin (b) is selected from the group consisting of: bisphenol A diglycidyl ether (DGEBA), bisphenol F diglycidyl ether (DGBF), epoxy cresol novolac, bis-(2,3-epoxycyclopentyl) ether, 2,3-epoxycyclopentyl glycidyl ether, 1,2-bis-(2,3-epoxycyclopentyloxy)-ethane, 3,4-epoxycyclohexylmethyl, and 3', 4'-epoxycyclohexanecarboxylate.

7. The method according to claim 1, wherein said at least one co-hardener compound (d) is a semilatent co-hardening compound selected from the group consisting of: 1-(2-cyanoethyl)-2-ethyl-4-methylimidazole, nadic anhydride, adipic acid dihydrazide, isophthalic acid dihydrazide, anthranilic acid hydrazide, 2-phenyl-4,6-diamino-s-triazine (benzoguanamine), 2-lauryl-4,6-diamino-s-triazine (lauroguanamine), phthalic acid, isophthalic acid, terephthalic acid, hexamethylenetetramine, 1,3 diamino benzene, 4,4'-methylenedianiline, and a combination thereof.

8. The method according to claim 1, wherein said at least one co-hardener compound (d) is a co-hardening compound at room temperature selected from the group consisting of: azobisisobutyronitrile, phenyl-azo-triphenylmethane, t-butyl peroxide, benzoyl peroxide, cumene hydroperoxide, t-butyl peracetate, benzenesulfonyl azide, and a combination thereof.

9. The method according to claim 1, wherein said actinic light source is selected from the group consisting of: a broad spectrum UV lamp, a visible light lamp, a UV LED, a visible LED, and a combination thereof.

10. The method according to claim 1, wherein said substrate is a sheath made of a material selected from the group consisting of: glass fiber, non-woven fabric, unidirectional or multidirectional non-woven fabric, polymeric felt, and a combination thereof.

11. A kit for in situ non-destructive remediation and/or repair of a pipeline according to the method of claim 1, the kit comprising:
   (1) a first container containing the first composition;
   (2) a second container comprising the at least one co-hardener compound;
   (3) the substrate capable of being impregnated with said second composition and to be inserted inside the pipeline to be remediated and/or repaired, said second composition resulting from mixing contents of the first container with contents of the second container; and, optionally, (4) the actinic light source having a wavelength between 100 and 600 run and a generator of a flow of gas or liquid at an adjustable pressure.

\* \* \* \* \*